United States Patent [19]

Hudson

[11] Patent Number: 5,602,832
[45] Date of Patent: Feb. 11, 1997

[54] RECEIVER DEVICE FOR CODE DIVISION MULTIPLEX COMMUNICATION SYSTEM

[75] Inventor: John E. Hudson, Stansted, United Kingdom

[73] Assignee: Northern Telecom Limited, Montreal, Canada

[21] Appl. No.: 310,258

[22] Filed: Sep. 21, 1994

[30] Foreign Application Priority Data

Sep. 22, 1993 [GB] United Kingdom ............... 9319550

[51] Int. Cl.$^6$ ............................ H04B 1/707; H04J 13/04
[52] U.S. Cl. .................... 370/342; 370/208; 375/206; 375/209
[58] Field of Search ................ 370/18, 19, 21, 370/22, 95.1, 100.1; 375/200, 205, 206, 208, 209, 210, 367

[56] References Cited

U.S. PATENT DOCUMENTS

| | | |
|---|---|---|
| 4,441,192 | 4/1984 | Kita et al. ........................... 375/209 |
| 4,689,626 | 8/1987 | Hori et al. .......................... 375/208 |
| 5,099,495 | 3/1992 | Mikoshiba et al. ................. 375/208 |
| 5,151,921 | 9/1992 | Hashi-Moto ......................... 375/208 |
| 5,173,923 | 12/1992 | Crespo et al. ...................... 370/19 |
| 5,329,547 | 7/1994 | Ling .................................. 375/205 |
| 5,353,300 | 10/1994 | Lee et al. ........................... 375/205 |
| 5,377,225 | 12/1994 | Davis ................................. 375/206 |

*Primary Examiner*—Benedict V. Safourek
*Assistant Examiner*—Chau T. Nguyen
*Attorney, Agent, or Firm*—Lee, Mann, Smith, McWilliams, Sweeney & Ohlson

[57] ABSTRACT

In a CDM (code division multiplex) communications system a base station transmits a plurality of data signals on a common channel. Each data signal is provided with a spreading sequence, e.g. a Gold code, each sequence being allocated to a user of that channel. Each receiver incorporates a channel estimator for determining the channel impulse response (CIR) and means for convolving the CIR estimate with the corresponding user code. This is then correlated with the received signal to recover the received data. The arrangement allows an increased number of users to share a common channel.

3 Claims, 5 Drawing Sheets

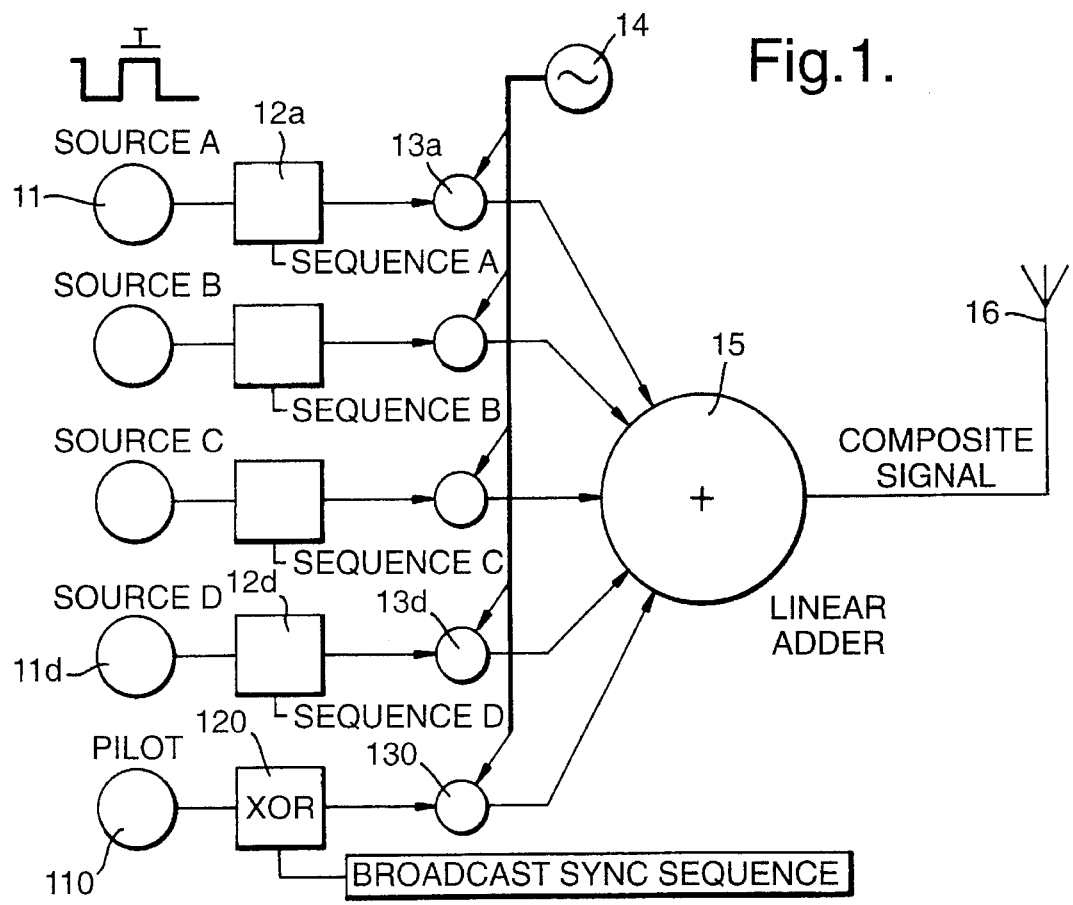
Fig. 1.
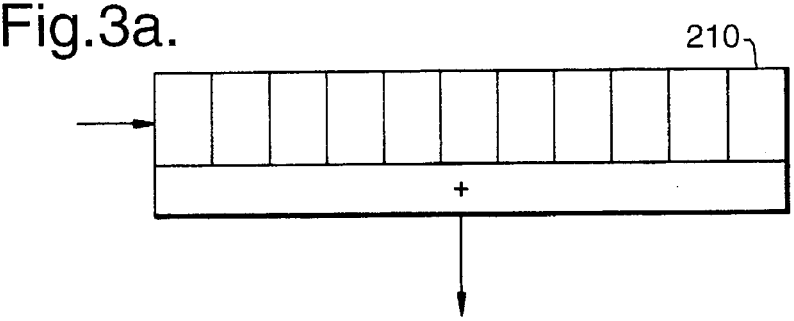
Fig. 3a.
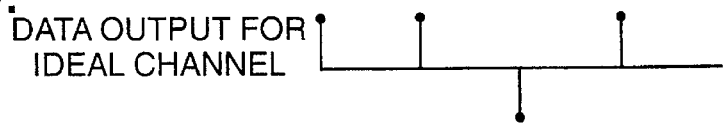
Fig. 3b. DATA OUTPUT FOR IDEAL CHANNEL
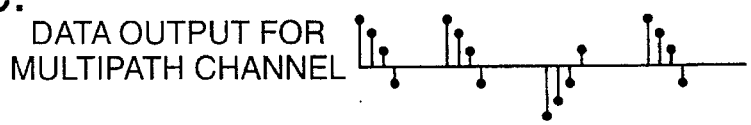
Fig. 3c. DATA OUTPUT FOR MULTIPATH CHANNEL

RECEIVER DEVICE FOR CODE DIVISION MULTIPLEX COMMUNICATION SYSTEM

This invention relates to CELLULAR communications systems and to communications receiver devices for use in such systems.

BACKGROUND OF THE INVENTION

Cellular communications systems providing a telephony service are attracting increasing commercial interest. In such systems a number of mobile or portable telephone instruments are in radio communication with a local base station. In a typical system, traffic is carried on the radio link between the telephone instrument and the base station in a digitally encoded format. This provides security of transmission and some resistance to interference. Because of the high (UHF) radio frequencies used for transmission between a mobile telephone and the base station, this transmission is effectively restricted to line of sight.

In metropolitan or dense urban areas the direct line of sight between a mobile telephone and the base station may be blocked by buildings and the mobile telephone thus receives a distorted version of the transmitted signal comprising a number of indirect multipaths or reflected signals. These signals may have relative time delays of more than 5 microseconds thus causing significant overlap of the various indirect signals. This can cause effective loss or 'break up' of the received signal.

A further difficulty, particularly in dense urban areas, is that of spectrum allocation. Indeed, the availability of spectrum can restrict the number of users that can be accommodated.

A recent approach to these problems has been the introduction of the code division multiplex (CDM) transmission technique. This technique is described, for example, by U Grob in IEEE Journal Selected Areas Comms., 8, June 1990 pp 772–780 and by W C Y Lee in IEEE Transactions on Vehicular Technology, 40 No 2, 2nd May 1991 pp 291–302.

In a CDM transmitter a number of data sources produce information bit streams in parallel. Each bit stream is associated with a corresponding binary spreading sequence which spreading sequence repeats after a predetermined period. The spread bit streams from the source are modulated onto a carrier and then added linearly to give a multiband composite RF signal which is broadcast to the mobile telephones within the service area of the transmitter. At each receiver, the composite signal is decomposed to individual messages by correlation with a particular spreading sequence associated with a particular message.

The technique allows a number of users to occupy the same channel thus significantly increasing the effective spectrum availability. However, with the rapidly increasing popularity of mobile communications services, there is a need to accommodate further users within each channel.

It is an object of the invention to minimise or to overcome this disadvantage.

A further object of the invention is to provide a receiver configuration that permits an increased number of users to occupy the same channel.

SUMMARY OF THE INVENTION

According to the invention there is provided a receiver apparatus for a code division multiplex (CDM) communications system in which a plurality of broadcast data signals are provided each with a respective spreading sequence, the receiver apparatus including a channel estimator adapted to provide a channel impulse response for a said spreading sequence which spreading sequence has been allocated to the receiver, means for convolving the channel impulse response with the sequence allocated to the receiver whereby to provide a matched sequence, and means for correlating the matched sequence with the received signal whereby to recover a said broadcast data signal.

According to the invention there is further provided a receiver apparatus for a code division multiplex (CDM) communications system in which a plurality of broadcast data signals on a common channel are provided each with a respective spreading sequence, the receiver apparatus including means for generating a copy of a said spreading sequence, that sequence having been allocated to the receiver, a channel estimator incorporating a matched filter adapted to provide a channel impulse response from the allocated spreading sequence, means for convolving the channel impulse response with said copy of the spreading sequence whereby to provide a matched sequence, and an adaptive filter to which in use a received signal is fed and whose coefficients correspond to the matched sequence whereby to despread the received signal and recover said data.

According to a further aspect of the invention there is provided a code division multiplex (CDM) communication system, including a base station and a plurality of receiver stations, wherein the base station has means for transmitting on a common channel a plurality of data signals provided each with a respective spreading sequence, each spreading sequence being allocated to a said receiver station, and wherein each receiver includes a channel estimator adapted to provide a channel impulse response for the spreading sequence allocated to that receiver, means for convolving the channel impulse response with the sequence allocated to the receiver whereby to provide a matched sequence, and means for correlating the matched sequence with the received signal whereby to recover the broadcast data signal.

BRIEF DESCRIPTION OF THE DRAWINGS

Embodiments of the invention will now be described with reference to the accompanied drawings in which:

FIG. 1 is a schematic diagram of a code division multiplexer (CDM) transmitter;

FIG. 3 illustrates the matched filter response of the receiver of FIG. 2;

DESCRIPTION OF PREFERRED EMBODIMENT

Figure 2:
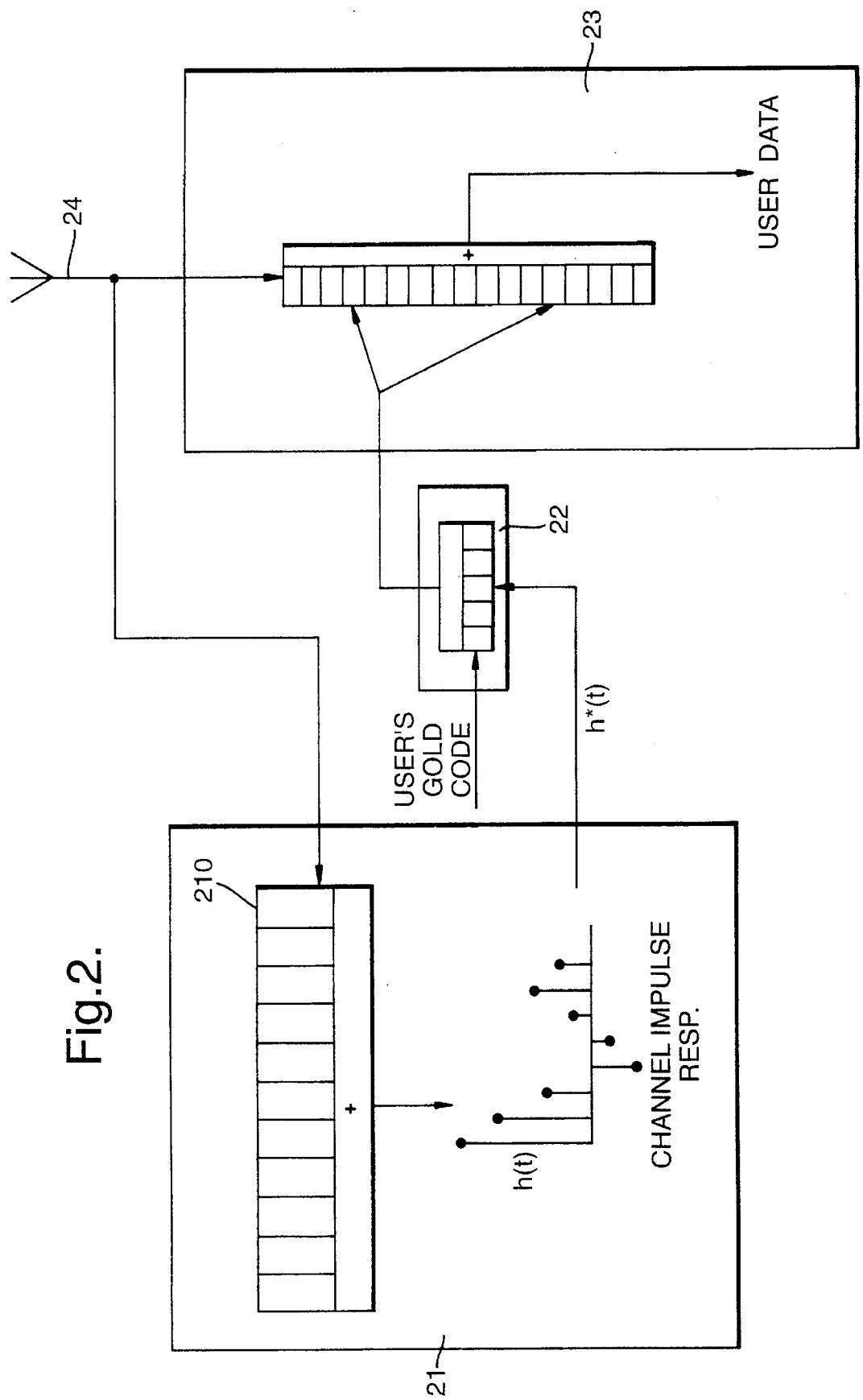
FIG. 2 is a schematic diagram of a receiver according to one embodiment of the invention.

Referring to FIG. 1, a CDM transmitter includes a plurality of data sources $11a$ to $11d$ each of which provides a respective sequence of binary information bits, each bit being of duration T seconds. In the interests of clarity, only four data sources have been shown in FIG. 1, but it will be appreciated that in practice a large number may be provided. Each data source 11 is coupled to one input of respective exclusive OR (XOR) gate $12a$ to $12d$, the other input of that gate being fed with a respective binary spreading sequence uniquely assigned to the respective data source. The chipping rate C of these sequences is an integral multiple K of the data source bit rate 1/T and there are thus K spreading sequence chips for each data sequence bit. All of the spreading sequences repeat after K chips. In a typical arrangement, K has a value of $2^{N-1}$ where N is the number of data sources. Advantageously, the spreading sequences comprise a set of Gold codes which have the property of matched orthogonality. Within a channel, each Gold code is allocated to a respective user. When each data source stream is XOR'ed by its respective spreading sequence, it becomes a sequence of repetitions of the spreading sequence with sign reversals according to whether each data bit is a ONE or a ZERO. The repetitive sequences thus generated are fed each to a corresponding modulator 13a to 13d driven with a carrier frequency from a local oscillator 14. The modulated signals are added linearly by adder 15, the composite signal being fed to an antenna 16 for broadcasting to the service area. A further data source 110 provides a pilot or reference signal and is XOR'ed with a broadcast synchronisation sequence in gate 120. The synchronisation sequence uses e.g. a PN (pseudo-noise) code which is received by the receiving station whereby to provide control timing information. The PN sequence may be designed to have good auto-correlation properties such that, when correlated with a replica of itself in a matched filter in a receiver, the output function traces the channel impulse response (CIR). The output of the gate 120 is fed to a respective modulator 130 whose output is in turn fed to the adder 15 whereby that output is combined with the outputs from the modulators 13a to 13d.

Referring now to FIG. 2, this shows a receiver circuit according to one embodiment of the invention. The receiver comprises three components or units, a channel estimator 21, a digital filter 22 and an adaptive matched filter 23. Broadcast signals received by the antenna 24 are fed to a further matched filter 210 incorporated in the channel estimator 23. This filter 210 provides an estimate of the channel impulse response (CIR).

In the receiver of FIG. 2, the channel impulse response is estimated by passing the broadcast synchronisation signal into the matched filter 210 incorporated in the channel estimator 21. The synchronisation signal may be isolated from the traffic part of the data by providing that signal in a special time slot which may easily be separated by gating. The synchronisation signal is designed such that, in the absence of the channel, the signal produces a matched filter response having a single large peak and very low side lobes. In the presence of a non-ideal channel, the matched filter response is convolved with the channel impulse response (CIR) and is thus a replica of the CIR.

The data part of the traffic is separated from the broadcast sequence and is passed to the adaptive matched filter 23. The purpose of this filter is to select one out of many users by matching only to the particular user's Gold code. For an ideal channel, when the CIR is an impulse, the Gold codes assigned to different users will be orthogonal for zero time shift and substantially complete isolation between users can be achieved.

Under non-ideal conditions tone effects become apparent in the matched filter 23. These are:
(i) a loss of orthogonality between user codes due to time shifting effects.
(ii) dispersion of the code among different multipaths with disparate time lags causes a loss of output power and a loss of performance against noise.

The loss of orthogonality is remedied by the adaptive filtering and this will be discussed below. The loss of output power is remedied by matching the filter 23 to the observed distorted version of the users code.

Normally, the user's Gold code is fed to the filter taps of the filter 23 in an unmodified form, apart from time reversal and complex configuration, and the filter correlates the code with the traffic data, Since the contents of the filter taps are constant for an ideal channel, this need be set up only once. When the channel is imperfect e.g. as a result of multipath reception, the internal replica of the user's Gold code is predistorted to match the code to the distorted Gold code arriving over the channel. This is effected by convolution of the local Gold code replica with the CIR estimate, this convolution having effected with the digital filter 22. The estimated channel impulse response is fed to the tap weights of the filter 22 which then convolve the ideal Gold code with this estimated response. This process need be updated only at a rate consistent with the rate of change of the channel impulse response. For a non-moving use the time period between updates can be several minutes.

The response of the matched filter 210 is illustrated in FIG. 3. In the presence of multipath signals, the matched filter produces several outputs in cascade, each output being a replica of the ideal channel response with different amplitude and phase weightings. The signal power is dispersed between these multiple outputs and is at a low level in any one of them. The channel estimator combines these outputs coherently to provide an effective diversity gain.

As described above, the output of the channel estimator 21 (FIG. 2) is fed to the digital filter 22 where the channel impulse response is convolved with the spreading sequence allocated to that receiver, i.e. the user's Gold code, to produce a modified Gold code sequence. This sequence is a replica of the Gold code sequence as actually observed at the receiver and so is a matched sequence for the user. The co-efficients of this modified and extended sequence are then used as filter co-efficients for the adaptive matched filter 23 whereby to despread the signal and recover the user data.

Figure 4:
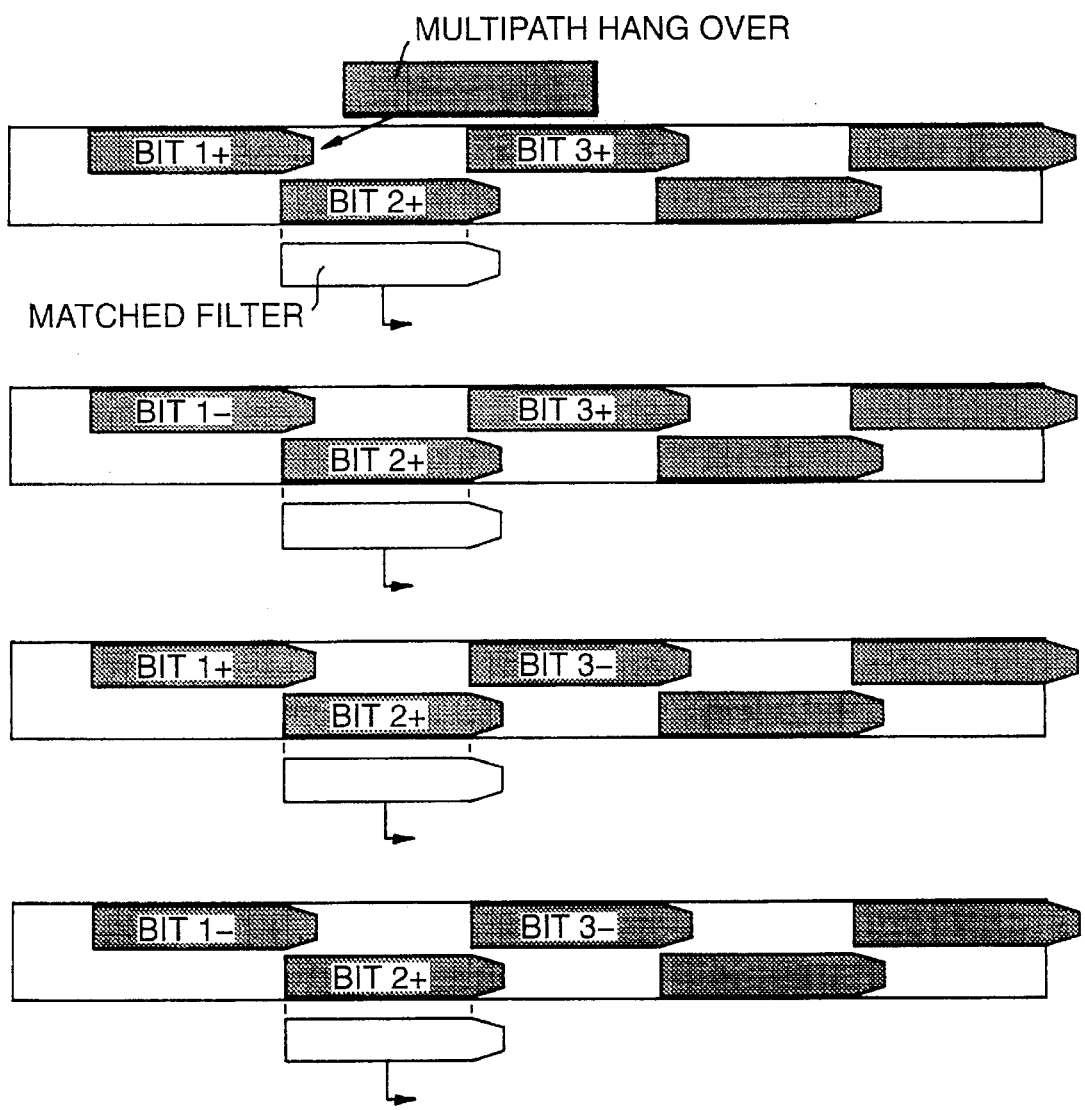
FIG. 4 is a timing diagram illustrating the operation of the receiver of FIG. 2.

FIG. 4 illustrates the mode of operation of the adaptive modification of the filter of the receiver of FIG. 2 whereby the filter is provided with variable coefficients. When this technique is employed with a multipath channel where intersymbol interference and interference from other users' codes are significant, the adaption of the filter significantly reduces the effects of these sources of interference. The sequence of data bits has been separated into even and odd bits for clarity. Each bit is extended in time by the multipath from N chips to N+E and the channel-matched filter does a weighted sum over the extended duration N+E of each data bit.

The output of the channel matched filter depends both on its total length and the coefficients. The assumption is made that the multipath duration is less than one data bit length T (E<N spreading chips) and the target bit is positive. There are three possible conditions to be considered.
(I) If the matched filter has full length, L=N+E, designed for maximum correlator energy output on the desired transmission then, when bit 2 of the figure is in the correct position and is being output, the filter also partially overlaps bits 1 and 3 on either side as is clear in the figure. Therefore its output has four possible values depending on the signs of the preceding and succeeding data bits.
(II) If the receiving filter has a truncated length of N or less L≦N, then it can be located in time so as to only overlap one other bit. This will occur when the filter is matched to the back end of the spreading sequence so that its correlation of the desired bit sequence starts after the tail end of the preceding bit sequence has disappeared and before the subsequent bit has started.

(III) If L≤N−E then the filter can be located so as not to overlap any surrounding bits. This would solve the IS problem, however in this case, if E is comparable to N there is a considerable loss in matching performance due to direct loss of energy and there would be enhanced susceptibility to thermal noise.

Figure 5:
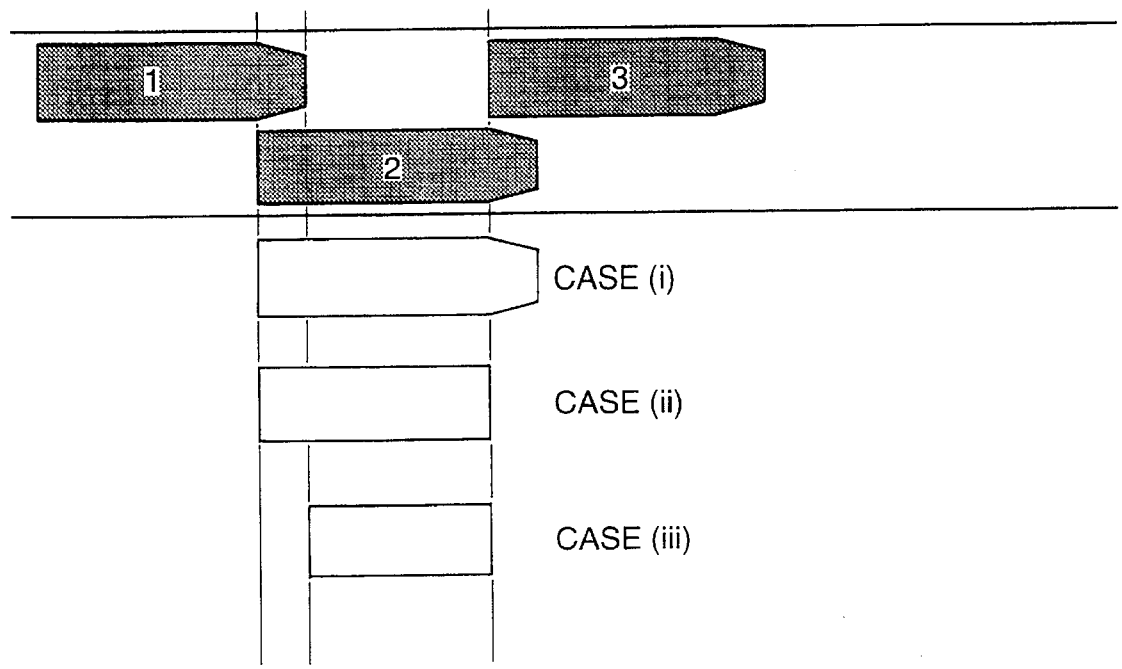
FIG. 5 is a further timing diagram.

These three possibilities are illustrated in FIG. 5. When the receiver filter has length N+E, and in intermediate conditions between N−E≤L≤N+E, there is interference from two other bits. One way to treat the situation is to consider that there is no inter-bit interference introduced by the channel but each source uses one of four different spreading codes dependent on the signs of the data surrounding the target bit.

Signal demodulation in the presence of intersymbol interference (ISI) but in the absence of other interference can best be done using a sequential decision algorithm such as a Viterbi decoder though, for the small amount of ISI expected, straightforward thresholding of the matched filter output would be nearly as good. However the data bits in question can also be other users data. Should it be required to make a modified receiving filter which is near-orthogonal to other users' sequences then, based on the concept of the four spreading codes introduced above, there are four different cross correlation values to be considered rather than just the one.

If the data bits are spread with codes having N chips then the sequence for a given data bit becomes a complex vector V with N elements. In the absence of multipath the matched filter output, at the instant of output sampling, can be represented as an inner product of the matched filter weights with the total input sequence and, by linearity, is a summation of the inner products of the weights with each of the individual sequences present in the input data.

The theory of linear algebra indicates that a given N-vector can be orthogonal to at most N−1 other linearly independent vectors. Thus a filter with N coefficients can be made orthogonal to N−1 spreading sequences yet retain a response to its desired sequence. Using Gold codes of duration N=2k−1 bits, N−1 users can share a channel which has no ISI and achieve orthogonality.

In case (I) above and intermediate cases with less than full length filters, each sequence can be distorted by multipath in four ways of sampling the filter output and given m actual users, a total of 4 m code variants (4(m−1) of which represent interference) is observed by the filter. In order that a mismatched receiver filter can be made orthogonal to all these variants of the data from the other m−1 users, we require that (N−1)>4(m−1) or m≤(N+3+/4 for exact orthogonality.

In case (ii) above with a shortened receiver filter it is only necessary to be orthogonal to 2(m−1) other codes so the corresponding condition is (N−1)≥2(m−1) or m≤(N+1)/2

The way in which the receiver matched filter can be automatically modified to achieve the desired orthogonality condition is now described.

Up-link receiver at the base station.

Here the mobile or remote users will all have different multipaths and, if the base station has to compute a filter directly from the ensemble of channel impulse responses, then it must be in a position to continuously update these CIR's. This is a formidable task, for several reasons:

The users will require a considerable data overhead in the provision of training sequences in their transmissions. The measurement of uplink CIR's is problematic in any case because of the very interference which is addressed in this paper and extended duration training sequences, i.e. much longer than the standard spreading sequences, may be necessary to give sufficient carrier to interference ratios.

The base station has the computation burden to track the multipath behaviour of a large number of mobiles.

Figure 6:
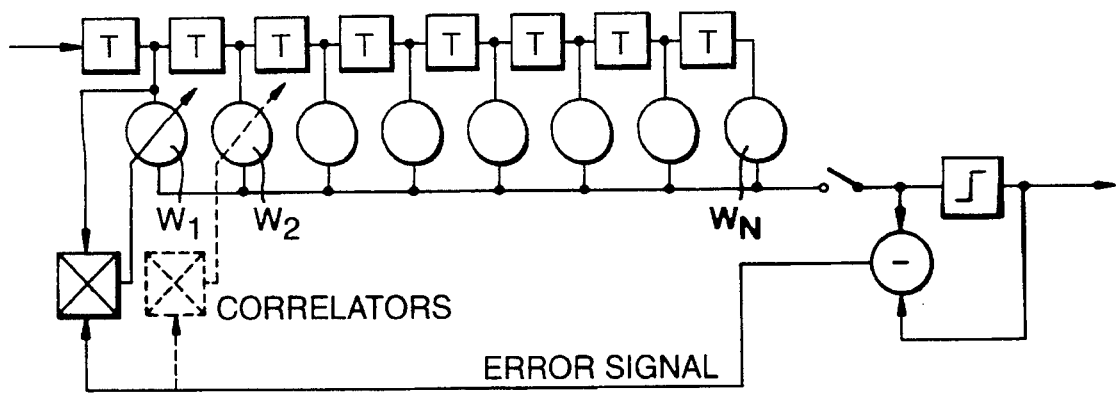
FIG. 6 shows an alternative receiver construction.

To reduce the computational task, we prefer to employ a feedback loop to adaptive update the weights without explicit knowledge of the channel impulse responses. There are a large number of algorithm suitable for this purpose and typically a least squares algorithm will minimise the means square errors between the matched filter output and the ideal output. A decision feedback equaliser can be used in this situation and FIG. 6 shows such a system in outline.

Downlink to mobiles.

Here the situation is less onerous since although all users on the downlink will have different CIR's they can share a common high-energy channel impulse response measurement signal, i.e. the broadcast sequence of FIG. 1, and it would be feasible to measure CIR and compute a matched filter directly. Alternatively an adaptive filter similar to that in the base station could be used.

As well as training the weights of the receiver filter, the length of the filter can be varied so as generate the conditions described above with reference to FIG. 4. Optimism of a performance criterion such as mean square error will achieve a compromise condition between high cancellation of strong or highly correlated interference and little extra cancellation of weak interference.

Figure 7:
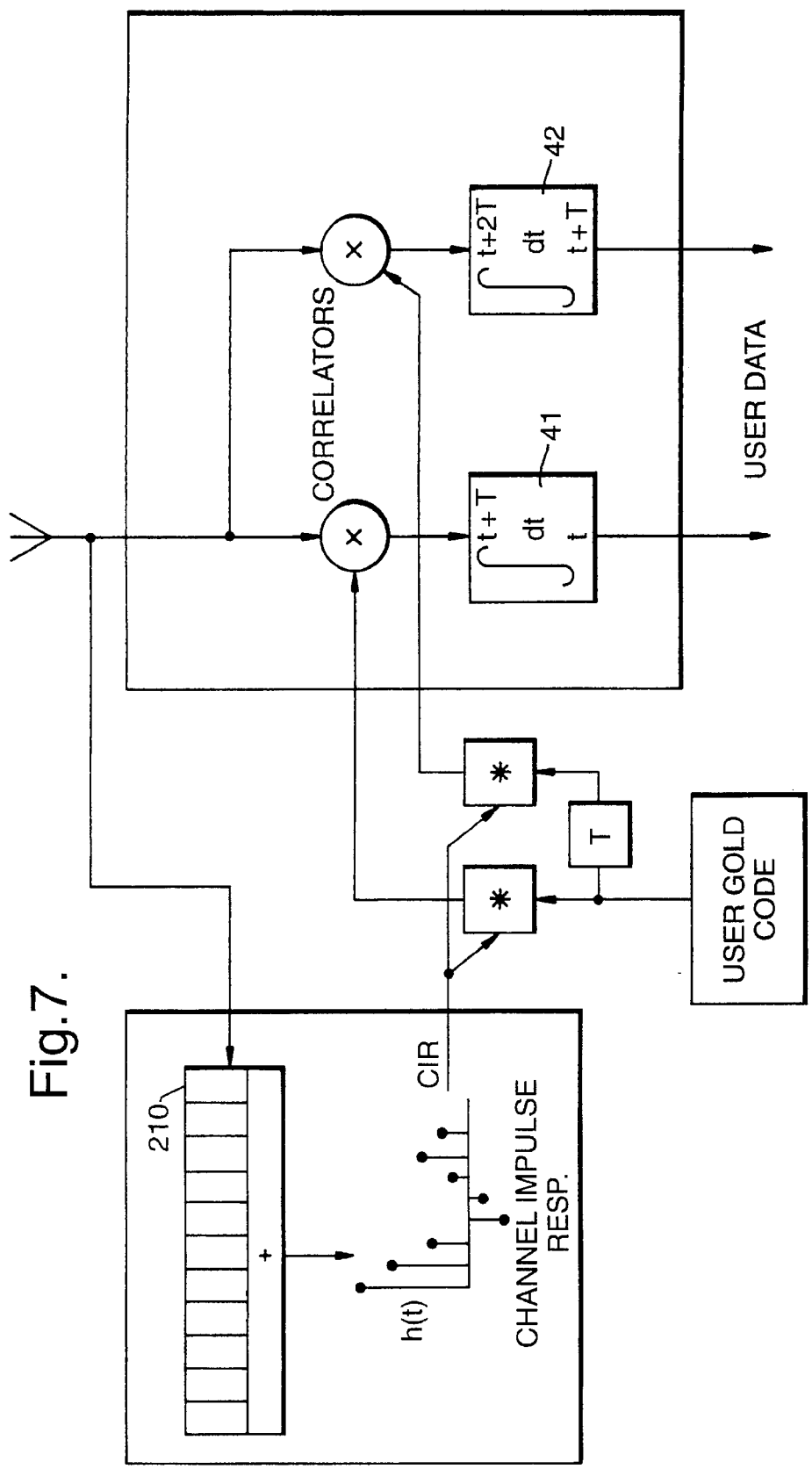
FIG. 7 shows a further receiver construction.

An alternative receiver construction is shown in FIG. 7 In this arrangement, the adaptive matched filter of the receiver of FIG. 2 is replaced by first and second integrate and dump filters 41, 42 respectively. In this receiver, the estimated channel impulse response is convolved with the receiver Gold code, as described above with reference to FIG. 2, whereby to generate a replica of the code as distorted by the channel. As the convolved sequence has an extended duration, the two integrators are used alternatively with some overlap of their integration periods. The mode of operation of this receiver is analogous to the receiver of FIG. 2 described above.

By providing increased discrimination between users, the technique described above allows the number of users sharing a channel to be increased. The receovers may comprise mobile receivers or they may comprise e.g. office data terminals.

I claim:

1. A receiver apparatus for a code division multiple access (CDMA) cellular communications system in which a plurality of broadcast data signals on a common channel include a data portion and are provided each with a broadcast synchronisation sequence and a respective one of a set of mutually orthogonal binary spreading sequences or codes, each said spreading sequence being allocated to a respective channel user, the receiver apparatus comprising a channel estimator having gating means for recovering the broadcast synchronisation sequence from a received broadcast signal and incorporating a matched filter having a channel impulse response to the synchronisation signal comprising a single peak with low side lobes; an adaptive matched filter to which said data portion of the received broadcast signal is fed and having an array of filter taps; means for storing a copy of the allocated spread sequence; digital filter means for convolving the allocated spreading sequence with the channel impulse response; the output of the digital filter means for convolving coupling the spreading sequence and the channel impulse response being coupled to the taps of the adaptive matched filter so as to despread the data portion of the received signal and recover the data.

2. A receiver apparatus as claimed in claim 1, wherein each said spreading sequence is in pseudonoise (PN) code.

3. A receiver apparatus as claimed in claim 2, wherein said spreading sequences comprises a set of mutually orthogonal Gold codes.

* * * * *